UNITED STATES PATENT OFFICE.

ARNOLD H. PETER, OF NEW YORK, N. Y.

PROCESS OF MAKING AN AMBERLIKE SUBSTANCE.

1,147,264.　　　　　Specification of Letters Patent.　　Patented July 20, 1915.

No Drawing.　　　Application filed October 5, 1909. Serial No. 521,093.

*To all whom it may concern:*

Be it known that I, ARNOLD H. PETER, a citizen of Switzerland, and a resident of the borough of Manhattan, city, county, and State of New York, have invented a new and useful Process of Making an Amberlike Substance, of which the following is a specification.

This invention relates to a new process for artificially producing an amber-like substance.

This new substance is most nearly analogous to amber since it possesses most of its characteristics. For example, it shows the same brilliancy in gloss and color so peculiar to amber; it shows the same delicate touch peculiar to amber; it shows the same properties in cutting, boring and polishing, etc., so valuable to amber; it shows the same insolubility in solvents such as alcohol and water, so peculiar to amber; it has thus far resisted, like amber, the determination of its composition or constitution, being inert to chemical reagents; and, like amber, it is transparent, and infusible. It has about the same specific gravity as amber. But it differentiates from amber in being highly resistant to electrification by rubbing. It is also non-inflammable. The new mass so closely resembles amber that it has been declared to be amber by experts after close inspection.

I carry out my process by the reaction of resorcinol and formaldehyde. For example:—An illustration for the production of the amber-like mass from resorcinol and formaldehyde is the following: Ten parts of resorcinol are dissolved in $7\frac{1}{2}$ parts of formaldehyde solution containing 37% of formaldehyde. The mixture is heated to 70° to 85° C. and kept at that temperature till the mass becomes of a semisolid or solid consistency, and is then heated to 100° to 110° C. for 4 to 8 hours, or for a longer time at lower temperature.

Another illustration to produce the amber-like mass is the following: Ten parts of resorcinol are dissolved in ten parts of formaldehyde solution containing 37% formaldehyde. The mixture is heated to 45° to 55° C., at which a reaction sets in. After the reaction has subsided, the temperature may be raised to finish the product. This product will be of darker color, but otherwise resembles the former product.

I do not want to restrict myself to these two examples. On the contrary, they serve to illustrate the wide range under which the amber-like mass from resorcinol and formaldehyde may be obtained. The percentage of formaldehyde in the formaldehyde solution may vary from about 36% to 40%.

The term "amber-like" as herein used has no reference to color, although the new mass has the peculiar color of amber unless dyes are employed in the process for changing the color.

I am not inclined to call my product a condensation product for the following reasons: By the illustrious researches of A. Bayer and his pupils on the reaction between phenols and aldehydes, a large number of new organic compounds have been produced, which have been described as condensation products. The physical and chemical properties of these condensation products are entirely different from the substance obtained by me in the reaction between resorcinol and formaldehyde.

In recent years, a large number of patents have become known on the production of rosin like substances by the reaction of phenol (carbolic-acid) and its homologues upon formaldehyde in the presence of inorganic or organic bases, of organic or inorganic acids, or salts which act as condensation agents. All these processes start from phenol or its homologues, or mixtures thereof, and formaldehyde, and an indispensable third substance or substances, under the most varied condition. The presence of these third substances has been the object of extensive studies, and appear to be most influential as well as indispensable and vital to the result of the process.

In contradistinction to all those processes, I start, not from phenol, or any of its homologues, but I start from meta-di-oxy-benzene. In further contradistinction, I do not need any third substance at all, to obtain the mass or product of my process. I want to state, however, that I might have a third substance present, in some cases acting acceleratingly upon the formation of my substance, and in others acting retardingly upon the formation of my substance. I mention these facts, as I want to include within the scope of this application the formation of the amber-like mass by the action of resorcinol upon formaldehyde, either alone or in the presence of other substance or substances. I have found that an addition of an alkali or salt generally accelerates the formation of my product, whereas the addition of alcohol, glycerin, sugar, etc., retards the formation of my product.

It is the behavior of my substance toward glycerin and sugar, that the most remarkable property has been observed, which, more than anything else, characterizes the substance as new and different from substances heretofore described under the name condensation products and rosin like substances. Glycerin or sugar, during the formation of my substance from resorcinol and formaldehyde form part of the mass without changing the mass to any great degree. I have used varying quantities of glycerin and sugar, up to 1/3 of my mass, and the influence of the different proportions was only slightly perceptible, and in the finished mass water would not extract glycerin or sugar. The fact that glycerin or sugar can be added in varying quantities, without having visible influence upon the product, indicates that this phenomena is an illustration of the solid solution; i. e., that the substance formed by the action of resorcinol upon formaldehyde during its formation, shows a marked power of absorption, and is therefore characteristic of this substance as thus produced. This power of absorption may be put to valuable technical uses; as, for instance, for incorporating dyes.

Another illustration of the absorptive power of the substance as produced from resorcinol and formaldehyde during its formation, is its behavior toward water. After mixing resorcinol and formaldehyde solution, a semi-solid or solid mass is formed upon standing, or quicker upon gentle heating, containing the water from the formaldehyde solution, and forming a homogeneous mass, neither the formation of layers nor separation of water can be noticed. These are characteristics of a colloidal mass.

A further characteristic of the colloidal state of substances formed from resorcinol and formaldehyde is the gradual reaction by which amber-like masses can be formed from resorcinol and formaldehyde.

While my new substance is most nearly analogous to amber, it is clearly distinct and differentiated therefrom. This is shown by the fact that while amber may be readily electrified by rubbing, my new substance is highly resistant to electrification by rubbing. The new amber-like substance is also differentiated from all other substances heretofore known.

What is claimed and what is desired to be secured by Letters Patent is:—

The process of producing a colloidal mass, which consists in mixing and heating resorcinol and formaldehyde in the proportion of 10 parts of resorcinol and 7½ to 10 parts of formaldehyde solution containing 36% to 40% formaldehyde, substantially as described.

In testimony whereof, I have signed my name to this specification, in the presence of two subscribing witnesses.

ARNOLD H. PETER.

Witnesses:
IDA G. GILMORE,
NICHOLAS M. GOODLETT, Jr.